Patented Mar. 16, 1937

2,074,183

UNITED STATES PATENT OFFICE 2,074,183

REAGENT AND PROCESS FOR TREATING CRUDE OILS

Paul R. Hershman, Chicago, Ill., assignor to Petro Chemical Company, Chicago, Ill., a corporation of Illinois No Drawing. Application June 7, 1934, Serial No. 729,479

6 Claims. (Cl. 196—4)

The invention relates to a process and novel reagent for desalting crude oils. However, while the invention is particularly directed to removing or reducing salts in crude petroleum oils, it also relates to the art of revolving water-in-oil emulsions.

Certain crude mineral oils as recovered from wells contain a large amount of salts or brines which if not removed from the oil prior to refining clog up and corrode the refinery equipment.

I have discovered that crude petroleum oils such as those derived from the Michigan field which have a high salt content can be desalted to a point such that running the crude in the refinery will result in substantially little if any deposition of salt in the refinery equipment. This invention is particularly adapted to a treatment of oils obtained from acid-treated wells.

In accordance with my invention a salt containing crude oil is treated with a caustic solution of a soluble acetate. Caustic soda is preferably used because of its cheapness together with sodium acetate. It will be understood that other soluble acetates may be used. The solution is preferably made up in high concentrations particularly when the quantity of water in the emulsion is high, but the concentration of the solution may vary over a large range and will be determined primarily by the amount of water present in the crude being treated. It is advantageous to proportion the amount of water in the solution so that the viscosity of the solution will approximate that of the oil since this facilitates intimate contact between the oil and the treating agent. The treatment is ordinarily carried out at atmospheric temperature but may, if desired, be carried out at more elevated temperatures and under super-atmospheric pressures.

In the treatment of tight emulsions, it is advantageous to additionally treat the oil with a solution of a bicarbonate salt such as sodium or potassium bicarbonate which is capable of decomposing at slightly elevated temperatures. The oil should be thoroughly mixed with the caustic-acetate solution prior to the addition of the bicarbonate since if the caustic alkali is permitted to come in contact with the bicarbonate prior to contact of the bicarbonate with the oil the bicarbonate will be reduced to a corbonate and its effect destroyed. The bicarbonate may be added either in a solution or in a solid form. The oil is preferably heated to a temperature of approximately 110° F. or above during the treatment with the bicarbonate. At these temperatures the bicarbonate slowly breaks down evolving carbon dioxide.

In the treatment of crude oils to demulsify them and remove salt contained in suspension, treatment with the alkali solution of acetate at ordinary temperatures is usually sufficient to bring about the desired result. However, in treating tight emulsions such as bottom settlings, it is advantageous to heat to a temperature of approximately 120 to 140° F. during the mixture with the alkali acetate solution and to further treat with bicarbonate.

The treatment with bicarbonate has also been found to be effective when used alone at elevated temperatures, for example, at temperatures between 100 to 135° F. or after treatments with well known types of reagents heretofore used for demulsifying oils.

As an example of my process, a crude oil from the Michigan field having a salt content of .75% was treated with approximately .1% of caustic-acetate solution, and the salt content was thereby reduced to .07%. This crude was thereupon treated with a bicarbonate solution at 130° F. and the salt content was thereupon reduced to .005%. The treatment with bicarbonate was carried out in a closed vessel under pressure of the gases liberated.

The following proportions of constituents from which my reagent is prepared is illustrative but is not limiting:

| | Percent |
|---|---|
| Caustic soda | 25 |
| Sodium acetate | 10 |
| Alcohol | 20 |
| Glycerine | 0 to 10 |
| Water | 35 to 45 |

The primary function of the alcohol in this mixture is to act as an anti-freeze in the cold weather. The glycerine is used to facilitate more intimate contact between the solution and the oil. This solution is used in quantities of .05 to .5% based on the weight of emulsion treated. The sodium bicarbonate or other carbonate is added either in the dry state or in solution in amounts substantially equal to the quantity of caustic-acetate solution used.

I claim:

1. A method for desalting and demulsifying oils which comprises mixing with said oils in continuous phase a composition comprising caustic alkali and a soluble alkali-metal acetate.

2. A method for desalting and demulsifying oils which comprises mixing with said oils a composition comprising caustic soda and sodium acetate, said oils being in continuous phase.

3. A method for desalting and demulsifying oils of the water-in-oil type which comprises thoroughly mixing the oils with a composition comprising a caustic alkali and a soluble acetate and separately treating the oil with a bicarbonate at temperatures above atmospheric.

4. A method for desalting and demulsifying oils of the water-in-oil type which comprises thoroughly mixing the oils with a composition comprising caustic soda and sodium acetate and subsequently treating the oil at temperatures above 100° F. with sodium bicarbonate.

5. A desalting and demulsifying reagent comprising caustic soda approximately 25%, sodium acetate approximately 10%, alcohol approximately 20%, glycerine up to approximately 10%, and water approximately 35 to 45%.

6. The method of desalting a crude petroleum oil of the type found in the Michigan field having a salt content of approximately .75%, which comprises treating the same with approximately .1% of an alkaline solution of sodium acetate, removing the major portion of the salt content, and then treating the partially desalted crude oil with a bicarbonate solution at approximately 130° F. under pressure.

PAUL R. HERSHMAN.